United States Patent
May

(10) Patent No.: US 9,694,640 B2
(45) Date of Patent: Jul. 4, 2017

(54) NON-CONTACT POWER SUPPLY FOR HEIGHT SENSOR WITH SINGLE CABLE

(71) Applicant: STEMCO Kaiser Incorporated, Millington, MI (US)

(72) Inventor: Lutz May, Berg (DE)

(73) Assignee: STEMCO KAISER INCORPORATED, Millington, MI (US)

( * ) Notice: Subject to any disclaimer, the term of this patent is extended or adjusted under 35 U.S.C. 154(b) by 0 days.

(21) Appl. No.: 14/248,708

(22) Filed: Apr. 9, 2014

(65) Prior Publication Data

US 2014/0306388 A1    Oct. 16, 2014

(30) Foreign Application Priority Data

Apr. 15, 2013    (EP) ..................... 13163790

(51) Int. Cl.

| | | |
|---|---|---|
| *G01B 7/14* | (2006.01) | |
| *F16F 9/04* | (2006.01) | |
| *B60G 11/27* | (2006.01) | |
| *B60G 17/019* | (2006.01) | |
| *F16F 9/32* | (2006.01) | |

(Continued)

(52) U.S. Cl.
CPC ............ *B60G 11/27* (2013.01); *B60G 17/019* (2013.01); *F16F 9/02* (2013.01); *F16F 9/3292* (2013.01); *G01B 7/102* (2013.01); *G01B 7/14* (2013.01); *B60G 2204/111* (2013.01); *B60G 2400/252* (2013.01); *B60G 2401/17* (2013.01); *F16F 9/04* (2013.01)

(58) Field of Classification Search
CPC .... F16F 9/04; F16F 9/05; F16F 9/3292; F16F 2230/08; G01B 7/023; B60G 11/27; B60G 11/019; B60G 2204/111; B60G 2400/252; B60G 2401/17

See application file for complete search history.

(56) References Cited

U.S. PATENT DOCUMENTS

| | | | | |
|---|---|---|---|---|
| 6,633,026 B2 * | 10/2003 | Tuominen | ............... | H02J 17/00 250/205 |
| 8,915,508 B2 * | 12/2014 | May | ..................... | F16F 9/3292 267/64.19 |

(Continued)

FOREIGN PATENT DOCUMENTS

| | | | | |
|---|---|---|---|---|
| DE | 10 2006 017 275 A1 | 10/2007 | ....... | B60G 17/01933 |
| DE | 10 2008 064 647 A1 | 2/2010 | ........... | B60G 17/019 |

(Continued)

*Primary Examiner* — Anna Momper
(74) *Attorney, Agent, or Firm* — Perkins Coie LLP

(57) ABSTRACT

The present invention reveals a distance sensor comprising: a signal receiving unit, an electromagnetic wave transmitting unit, and a magnetic signal transmitting unit; wherein the signal transmitting unit is adapted to transmit to the signal receiving unit a sensed distance between the signal receiving unit and the magnetic signal transmitting unit, wherein the magnetic signal transmitting unit further comprises an electromagnetic wave receiving unit and an electromagnetic wave-to-electric power converter, and wherein the electromagnetic wave receiving unit receives electromagnetic waves transmitted from the electromagnetic wave transmitting unit to operate the magnetic signal transmitting unit.

16 Claims, 3 Drawing Sheets

(51) Int. Cl.
*F16F 9/02* (2006.01)
*G01B 7/06* (2006.01)

(56) References Cited

U.S. PATENT DOCUMENTS

2006/0266917 A1* 11/2006 Baldis et al. ................. 250/200
2007/0257833 A1* 11/2007 Nordmeyer .................. 342/118
2009/0020928 A1    1/2009 Nordmeyer
2012/0056616 A1    3/2012 May ........................ 324/207.15

FOREIGN PATENT DOCUMENTS

| DE | 19701530 C1 | 2/2010 | |
|----|-------------|--------|---|
| EP | 1 845 278 A1 | 10/2007 | ....... B60G 17/01933 |
| EP | 2 366 972 A2 | 9/2011 | .............. G01B 7/00 |
| EP | 2735760 A1 | 5/2014 | |

\* cited by examiner

NON-CONTACT POWER SUPPLY FOR HEIGHT SENSOR WITH SINGLE CABLE

This application claims benefit of European Patent Application Serial No. EP 13163790.2, filed on Apr. 15, 2013. The teachings of European Patent Application EP 13163790.2 are incorporated herein by reference in their entirety.

TECHNICAL FIELD OF THE INVENTION

The invention relates to an air spring for a vehicle and to an air spring system comprising a multitude of air springs.

BACKGROUND OF THE INVENTION

Height or distance measurement has a wide variety of possible applications. For instance, it is a parameter that frequently needs to be monitored to optimize the performance of various types of machinery and vehicles, such as automobiles, trucks, trains, agricultural vehicles, mining vehicles, construction vehicles, and the like. For instance, monitoring height and various distances can lead to reduced fuel consumption, improved comfort, reduced overall cost, extended product service life, and safety. In any case, the need to monitor such distance parameters generally increases with sophistication of the devise and the complexity of its features.

Virtually every aspect of complex machinery may need to be tightly monitored and controlled to attain maximum advantages. For instance, constant adaptations may be required to optimize the performances and efficiency of almost every moving part of the machinery. This typically needs to be done while the operational conditions in the environment of the equipment are subject to change and can change significantly over very short time frames. Changing environmental conditions are virtually always encountered by vehicle. In addition to this vehicles frequently operate under changing conditions which can make monitoring a difficult challenge. For instance, monitoring suspension height by distance measurements between air spring components can yield useful information. However, the environment where the height measurement is being made can present a wide variety of challenges. For example, in measuring the height of a vehicle frame above the surface of a road, challenges are typically presented by road noise, dirt, dust, and vibrations which are normally present in the environment surrounding the vehicle where the measurement is being taken.

DE 10 2006 017 275 A1 and EP 1845278 A1 describe an air spring having an integrated positioning device, wherein the distance between two parts of the air spring can be measured by an analogue proximity sensor. Commonly used proximity sensors are, for example, based on an ultrasonic measurement principle which is very sensitive in noisy and vibrating environments, as the acoustic noise and the ultrasonic measurement principle are based on the same physical principle, i.e. sound propagation.

These pneumatic air springs have an integrated height measuring device, a pressure chamber or an inner chamber. The exterior of the inner chamber is aligned in the analog proximity sensor and a metal plate is arranged opposite to the interior of the proximity sensor. The proximity sensor and the metal plate are formed pre-adjustable to each other.

Further, DE 10 2008 064 647 A1 describes an air spring for a vehicle having a measuring device, which measuring device may transmit data and energy via predetermined and fixed distance contactless. This pneumatic cushioning equipment has a base unit which has a pressure source and a valve unit which has an air supply line made of non-metallic material, particularly plastic. A switching valve of the base unit is provided between the pressure source and appropriate valve unit of the arranged air supply.

United States Patent Publication No. 2012/0056616 A1 and EP 2 366 972 describe a sensor device for height measurement in an air spring and a corresponding method allowing determining changes in a working stroke of the air spring. These publications more specifically disclose a sensor device for a height measurement, comprising: a transceiving coil arrangement including at least one transceiving coil; a transmitting drive unit; a receiver unit; a reference coil arrangement; and a reference control unit, wherein the transceiving coil arrangement is coupled to both the transmitting drive circuit and the receiver unit, wherein the reference control unit is coupled to the reference coil arrangement, wherein the reference coil arrangement is movably positioned with respect to the transceiving coil arrangement, wherein the drive unit is adapted to drive the transceiving coil arrangement with an AC power signal of a predetermined duration for generating a magnetic field, wherein the reference control unit is adapted for accumulating energy out of the generated magnetic field and for generating a reference signal based on an amount of the accumulated energy, and wherein the receiver unit is adapted for receiving the reference signal and for outputting a signal for determining a distance between the transceiving coil arrangement and the reference coil arrangement based on at least one out of a group, the group consisting of the reference signal and the duration of the AC power signal.

SUMMARY OF THE INVENTION

The present invention reveals a distance sensor comprising: a signal receiving unit; an electromagnetic wave transmitting unit; and a magnetic signal transmitting unit; wherein the signal transmitting unit is adapted to transmit to the signal receiving unit a sensed distance between the signal receiving unit and the magnetic signal transmitting unit, wherein the magnetic signal transmitting unit comprises an electromagnetic wave receiving unit and an electromagnetic wave-to-electric power converter, and wherein the electromagnetic wave receiving unit receives electromagnetic waves transmitted from the electromagnetic wave transmitting unit to operate the magnetic signal transmitting unit. The electromagnetic wave transmitting unit and the electromagnetic wave receiving unit will typically operate within the range of about $10^{-7}$ meters to about $10^{-3}$ meters and will more typically operate within the range of about $10^{-7}$ meters to about $10^{-5}$ meters. Accordingly, the electromagnetic waves will typically be visible light having a wavelength with is within the range of 380 nanometers to about 700 nanometers or will be within the infrared range. It is normally preferred for the electromagnetic waves to be infrared light having a wave length which is within the range of about 700 to about 10,000 nanometers. Accordingly, it is typically preferred to utilize an infrared transmitting unit and the infrared receiving unit which operates within the range of 700 nanometers to 1100 nanometers and which preferably operates within the range of 850 nanometers to 950 nanometers.

The subject invention further reveals an air spring comprising: a first mounting plate being adapted to be mounted to a chassis of a vehicle, a second mounting plate being adapted to be mounted to a wheel suspension, a top plate, a bottom plate, a flexible member, and a distance sensor comprising: a magnetic signal receiving unit, an electromagnetic wave transmitting unit, and a magnetic signal transmitting unit; wherein the signal transmitting unit is adapted to transmit to the signal receiving unit a sensed distance between the signal receiving unit and the magnetic signal transmitting unit, wherein the magnetic signal transmitting unit comprises an electromagnetic wave receiving unit and an electromagnetic wave-to-electric power converter, and wherein the electromagnetic wave receiving unit receives electromagnetic waves transmitted from the electromagnetic wave transmitting unit to operate the magnetic signal transmitting unit.

The subject invention also discloses an air spring comprising a piston, a top plate, a flexible member, and a distance sensor, wherein the flexible member is affixed to the piston and the top plate, wherein the piston, the top plate and the flexible member define a pressurizable chamber, wherein the distance sensor comprises a signal receiving unit, an electromagnetic wave transmitting unit, and a magnetic signal transmitting unit; wherein the signal transmitting unit is adapted to transmit to the signal receiving unit a sensed distance between the signal receiving unit and the magnetic signal transmitting unit, wherein the magnetic signal transmitting unit comprises an electromagnetic wave receiving unit and an electromagnetic wave-to-electric power converter, and wherein the electromagnetic wave receiving unit receives electromagnetic waves transmitted from the electromagnetic wave transmitting unit to operate the magnetic signal transmitting unit.

The distance sensor of this invention can be use advantageously in conjunction with air spring height measurements. It offers the advantage of not being sensitive to changes in air pressure, it is not sensitive in a noisy environment (sound noise, EMV noise, and other sources). Further, it is not sensitive to a wide range of magnetic signal interferences and is truly non-contact and maintenance free. It can tolerate dust and dirt and will not interfere with any other systems or any living species near or far.

The height measurement system of this invention can be placed inside of air springs. It offers an extended measurement range of more than 400 mm. It requires no electrical connections between the electronic circuits used inside of the air spring at the top and at the bottom. Only one electrical connector is needed at one end of the air spring connecting to the outside of the air spring (avoids the need for two electrical connectors with one being at each end of the air spring). Wireless energy transfer is achieved inside the air spring and therefore maintenance free operation is offered with no moving parts and no wires that can age and/or be subject to damaged.

DETAILED DESCRIPTION OF THE INVENTION

Figure 1:
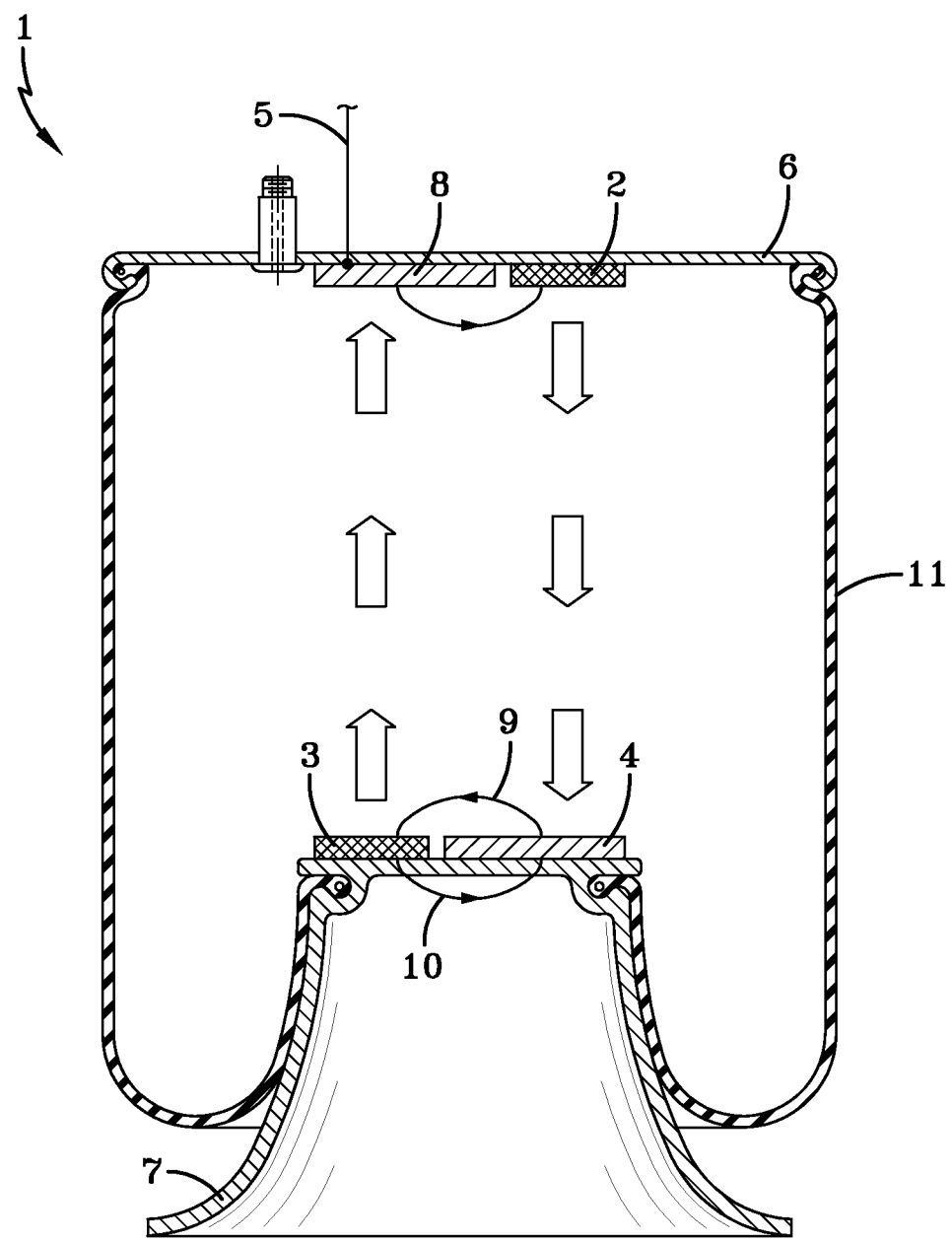
FIG. 1 depicts an air spring 1 having a height sensor system which included an IR energy transmitting system 2 which is installed inside of the pressurizable chamber of the air spring.

A smart air spring (SAS) is an air spring with integrated sensor system of the type described herein. This sensor system can measure the actual height of the SAS unit and can potentially take additional measurements. For instance, physical parameters in addition to height or distance measurement can optionally be detected and measured as well. These physical parameters include, but are not limited to, temperature, air-pressure, changes in position, vibration, and the like.

For a number of reasons, including cost considerations and reliability, it would be desirable for smart air springs to have required electrical connections to the height sensor system on only one side of the smart air spring. Preferably, a single electrical connection would be the top-side of the smart air spring near where it is mounted to a vehicles chassis because in that position it will typically experience less vibration and because it will generally be more protected from outside elements that could potentially damage the unit or compromise its operation.

The air springs of this invention can be used on virtually any type of vehicle of including automobiles, aircraft, trucks, buses, coaches, constructions equipment, fork-lift trucks, mining equipment, motorcycles, bicycles, and the like. The air springs of this invention can also be used in industrial applications, such as processing and manufacturing equipment, conveyor belt dampening systems, laboratory equipment, mining and drilling equipment, and the like. The air springs of this invention are also useful in consumer products including high-end clothes washers, clothes dryers, dishwashers, sports equipment, and the like.

There are a number of ways by which the distance measurement between the top-plate and the bottom plate in an air spring can be determined. In cases where a height sensor is used an electrically active circuit in required at both ends of the inside of the air spring unit. In such cases electrical modules at the top plate of the air spring and at the bottom plate of the air spring require an electrical power supplies. In another embodiment of this invention, an electrical module can be situated at the top plate of the air spring with a second electrical module being located at the bottom mount of the air spring again with both units requiring an electrical power supply.

One objective of this invention is to avoid the need for a second external electrical connector in smart air springs that provide height measurement information. In any case, the system of this invention provides a reliable electrical supply at both ends of the inside of an air spring which can be utilized for any needed purpose. This objective is accomplished by using non-contact, magnetic principles and can be employed to supply electrical power for air spring height sensor systems as well as other purposes.

The height sensor or distance measurement of this invention includes an AC driven magnetic field source that is sitting at one end of the air spring. This AC driven magnetic field source is usually situated near the bottom plate or the bottom mount of the air spring with a magnetic principle based signal receiving unit at the top plate of the air spring. The AC driven magnetic field source (sometimes referred to as the "signal transmitter" or the "reference point") requires electric power to function. There are several options for providing such electric power to the signal transmitter (or the reference point) including rechargeable batteries, non-rechargeable batteries, direct electric wiring connections, modulation of audible sound, non-audible sound, or air pressure, magnetic energy power transfer (pulse powered or AC powered), and visible or non-visible light (inferred light or ultraviolet light). The use of batteries is normally a less attractive option since batteries have a finite life which is typically less than the service life of air springs.

Air springs typically experience millions of vibration cycles with the air spring contracting and expanding during each cycle. These vibration cycles are caused by road surface conditions and by purposely changing the air pressure inside the air spring to change its height. In any case, it is difficult, if not impossible, to pass an electric wire connection through the air spring from its top plate to its bottom plate. Furthermore, the relentless vibration experienced during normal service conditions will generally cause a conventional wire to break apart or to sever destroying the functionality of the smart air spring. In cases where a more robust wire structure is utilized there is a danger that the wire will damage the rubber sleeve of the air spring over time.

The utilization of sound energy is not a commercially viable option because it is difficult to convert sound into work. Furthermore, audible sound is impractical because humans would be annoyed by the emission of sound from the air springs. Also, frequencies which are outside of the range perceptible to humans could have detrimental consequences on by domestic animals and wild animals. Additionally, semi-mechanical parts would be required (sound emitter and sound receiver) both of which would have a limited service life by virtue of mechanical wear and tear.

The utilization of magnetic energy transfer limits the maximal distance which can be measured. This is because the magnetic energy transfer system has to fit within the confinement of the air spring which can be of small diameter and of relative great length. A typical ratio between air spring diameter and the maximal air spring length can be factor 3 to 3.5. When considering the electric energy that is tolerable to the user for a complete smart air spring sensor system (in the area of 100 mA to 200 mA, but below 500 mA) then the maximal achievable distance for magnetic energy transfer is below the ratio 2 (air spring length divided by air spring diameter). This would allow providing an electric current of around 5 mA to 20 mA at the bottom plate. This is good enough for some (shorter) air springs, but not for all commercially important air spring products.

In the practice of this invention the energy transfer from the top plate (where the height sensor signal receiver unit is placed) to the magnetic signal transmitter unit (which is placed at the other end of the air spring, usually at the bottom plate) will typically be powered by non-visible light energy, such as infrared light. An illustration of the basic sensor system design of this invention is provided by FIG. 1.

FIG. 1 depicts an air spring 1 having a top plate 6, a bottom plate 7, a flexible member (a rubber belly) 11, and a height sensor system which included an electromagnetic wave (IR energy) transmitting system 2 which is installed inside of a pressurizable chamber which is defined by the top plate 6, the bottom plate 7, and the flexible member 11 of the air spring 1. The height sensor signal transmitter 3 which is situated in the bottom part of the sensor system is powered by an electromagnetic wave (IR) power receiver and converter 4. An electrical connector 5 is used to transfer electrical power from the outside to the inside of the air spring, and to conduct the sensor measurement results to the outside of the air spring.

In most vehicle applications the top plate 6 of the air spring is mounted to a vehicles chassis (not shown), with the bottom mount 7 of the air spring being mounted to the suspension system or the vehicles axle frame (not shown). For the air spring height sensor to work a magnetic signal transmitter is placed at the bottom mount 7 of the air spring and the height sensor receiver 8 is situated immediately under the top plate 6. In this embodiment of the invention the magnetic principle based signal receiver 8 is mounted inside of the air spring 1 (within a pressurizable chamber which is defined by the top plate, the bottom mount which acts as a piston and the flexible member). In another embodiment of the invention the magnetic signal receiver can be mounted from the outside of the air spring 1, onto the top of the top plate 6.

To avoid the need for an additional electrical connector to the outside of the air spring, electrical power is conducted from the signal receiver to the IR energy transmitter which is also mounted to the top plate. In this specific case the IR energy transmitting unit has to be placed inside the air spring. Therefore, the IR energy transmitter unit cannot be placed outside of the air spring.

Electromagnetic waves, such as IR energy, will be transmitted from the IR power transmitter 2 downwards (in this configuration) to the IR power receiver and converter unit 4. The direction and path taken by the IR energy is shown by the three downward facing arrows. At the bottom mount 7, through two electrical wires 9 and 10, the harvested electrical energy will be conducted to the height sensor signal transmitter unit 3. From there a magnetic signal will be send upwards to the height sensor receiver 8. The transmitted magnetic signal itself builds the basis to measure the distance between the magnetic signal transmitter 3 and the magnetic signal receiver 8. It is important for the IR transmitting module and the IR energy receiving unit to have an unobstructed optical path between them with nothing in the path which will block the IR light from reaching the IR power receiver and converter. In cases where there is not an unobstructed straight path between the IR power transmitter and the IR power receiver and converter reflectors and/or mirrors can be used to direct the IR light from the IR power transmitter to the IR power receiver and converter.

The optical principle based energy (power) transfer system of this invention relies on an optical power transmitter device and an optical power receiver device. The optical power transmitter device is typically located immediately below the top-plate inside the rubber belly (or rubber sleeve) of the air spring. Consequently, the optical power receiver unit will be placed at the bottom of the air spring unit where the magnetic signal transmitter will be located.

In an alternative embodiment of this invention visible light can be used rather than infrared light. However, this option is typically less attractive since there is a risk that the receiving unit may become increasingly less efficient in cases where dust particle build up on the optical receiver device, such as a voltaic solar cell or a light sensitive LED. Also, the translucency of the components used can change over time which will again reduce the efficiency of the unit. Therefore, invisible, low wavelength light will typically be used because it is less sensitive to dust, dirt, surface structures and loss of translucency.

Measures can be taken to increase the efficiency of the IR energy transfer process via the utilization of reflective coatings, mirrors, and lenses which can be used to "channel" the IR energy as efficient as possible (with the lowest losses) towards the IR energy receiving unit. However the lenses and reflectors have to be suitable properly to work with IR energy (not visible light). The benefit of using lenses, reflective coatings and/or mirrors is that less electrical energy will be wasted. In other words, the overall electrical power consumption of the installed height sensor system can be reduced significantly.

Figure 4:
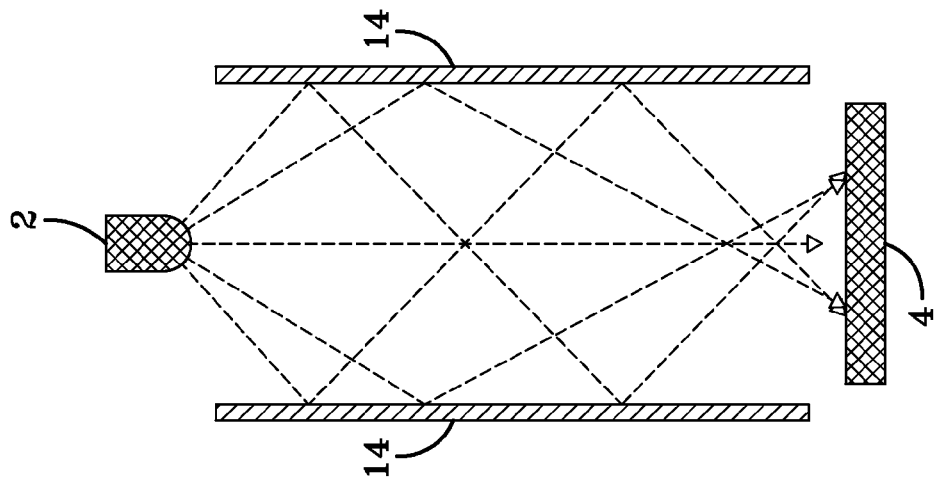
FIG. 4 illustrates an embodiment of the invention wherein reflectors direct the stray rays IR light to the IR energy receiver to improve efficiency.
Figure 3:
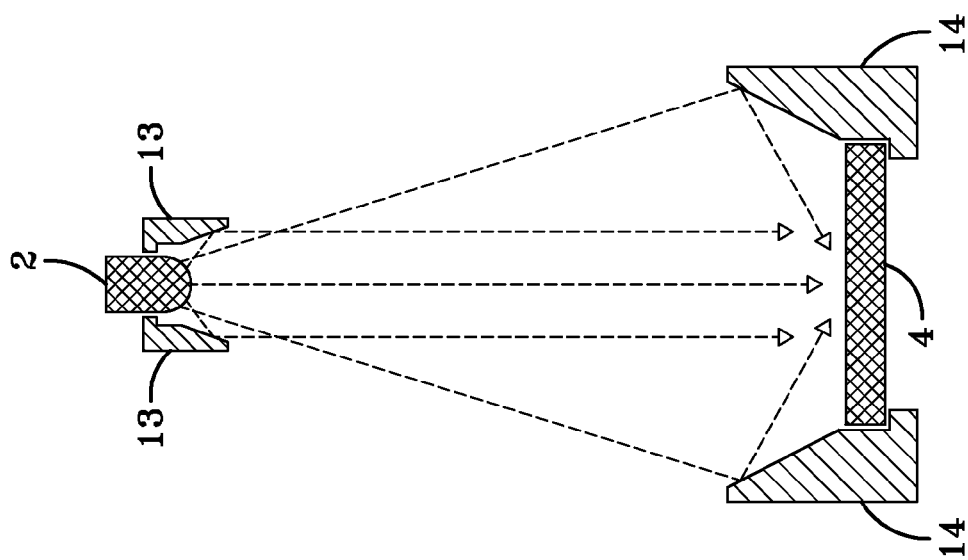
FIG. 3 illustrates an embodiment of the invention wherein a first mirror or set of mirrors is situated in close proximity to an IR energy transmitter and directs the IR light to the IR energy receiver as a more focused beam.
Figure 2:
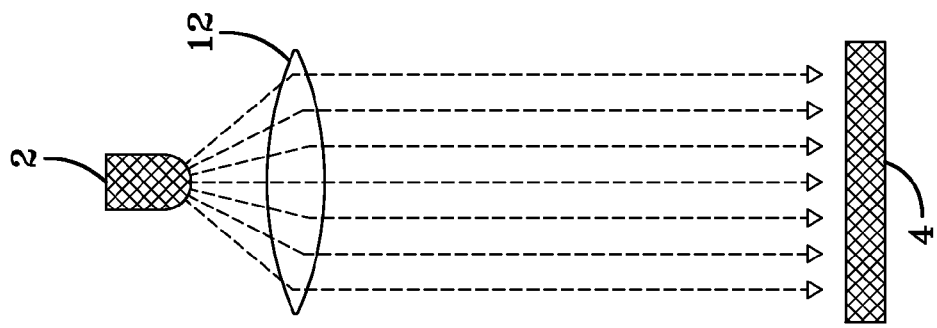
FIG. 2 illustrates the utilization of a lens 12 which is situated between a IR energy transmitter and an IR energy receiver to attain a higher level of efficiency by focusing a beam of IR light directly to the IR energy receiver.

FIG. 2, FIG. 3, and FIG. 4 depict scenarios in which lenses and mirrors can be used to increase the efficiency of the energy transfer. In these scenarios non-contact IR (infrared) energy transfer is enhanced with appropriate lenses, mirrors, and/or reflective coatings. In all of these scenarios the IR light is directed more efficiently to the IR energy receiver 4 so as to minimize the level of extraneous IV light which fails to reach the IR energy receiver 4. As illustrated in FIG. 2 an IR lens 12 can be situated between the IR energy transmitter 2 and the IR energy receiver 4 to attain a higher level of efficiency by focusing a beam of IR light directly to the IR energy receiver 4. In most cases the lens 12 will be situated near the IR energy transmitter 2. In most cases this will be no more that 20% of the total distance between the IR energy transmitter 2 and the IR energy receiver 4. The lens will typically be positioned no more than 10% away from the IR energy transmitter 2 on the path between the IR energy transmitter 2 and the IR energy receiver 4.

As depicted in FIG. 3, polished steel or anodised aluminum mirrors can be used to achieve higher levels of efficiency. In the embodiment of the invention a first mirror or set of mirrors 13 is situated in close proximity the IR energy transmitter 2 and directs the IR light to the IR energy receiver 4 as a more focused beam. A second mirror or set of mirrors then collects the IR light and again focuses it on the IR energy receiver 4.

As depicted in FIG. 4, IR reflectors 14 can be used to redirect stray rays of IR light to the IR energy receiver 4. Such IR reflectors 14 will typically be comprised of a flexible material. For instance, an IR reflective coating, such as a silica formulation, can be sprayed on the inside of the rubber belly (sleeve) of the air spring. Since the air spring will change significantly in height during use solid reflectors are inappropriate.

Figure 5:
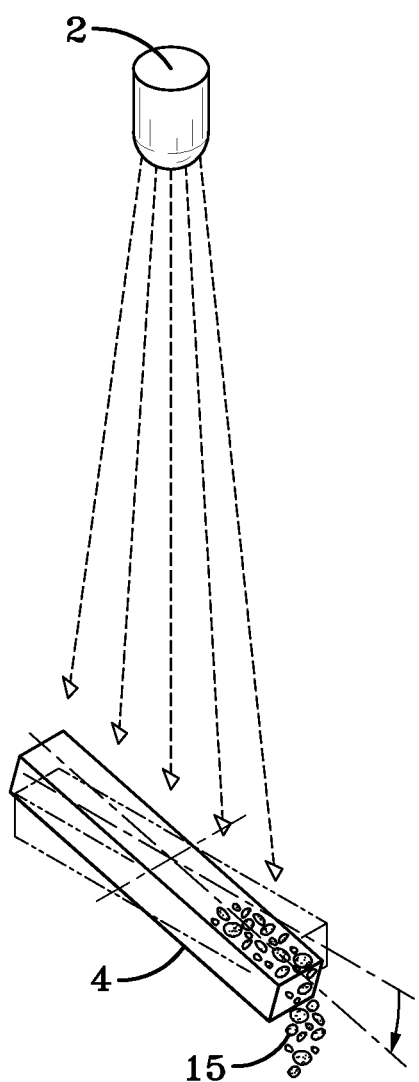
FIG. 5 illustrates an embodiment of the invention wherein an IR energy receiver is mounted to the bottom plate of the air spring at an angle to provide a self-cleaning effect.

Normally, very limited dust and dirt is present inside of air springs because the compressed gas (air) therein can be filtered to assure a long service life. However it is prudent to mount the IR energy receiver 4 unit in a slightly tilted orientation from being horizontal (and not parallel to the earth surface). For instance, the IR energy receiver 4 can be tilted at an angle of 2° to 40° from being parallel to the bottom plate of the air spring. It is typically preferred for the IR energy receiver 4 can be tilted at an angle of 3° to 8° from being parallel to the bottom plate of the air spring. This configuration utilizes the force of gravity to cause any dirt or dust 15 which is present to glide off, slide off, or fall off the edge of the IR energy receiving unit 4 as depicted in FIG. 5 to provide a self-cleaning effect. Vehicles vibration (when driving over various smooth or rough road surfaces) will aid the effect of dirt particles being shaken-off the IR energy receiver 4.

When air springs are under low pressure the rubber structure of the flexible member (belly) begins to collapse. When the air spring is under higher air pressure then, by design, the air spring extends its length. In the "normal operation" of an air spring the distance between the IR energy transmitter unit and the IR energy receiving unit is constantly changing. Under normal design conditions, the IR energy transfer efficiency will be much higher when the air spring is in collapse mode (getting shorter) than when the air spring is in the extended mode (getting longer). Consequently there will be more electric energy available (through the IR energy transfer system) when the air spring is shorter, and there will be less electric energy available when the air spring is longer.

There are a number of design concepts that can compensate for this change of the energy transfer rate. One solution is to use an electrical energy storage device (for example, a high value capacitor or gold-cap, or rechargeable battery) that will store energy when there is surplus available, and it will release electric energy when there is not enough supply available.

Another solution is to use a feedback loop (by taking the height sensor measurement signal itself) that will automatically modulate/change the IR energy signal amplitude (of the IR energy transmitter) in relation to the distance between the IR energy transmitter and the IR energy receiver. The larger the distance the higher the transmitted IR energy has to be. In most cases this will be an exponential function.

Figure 6:
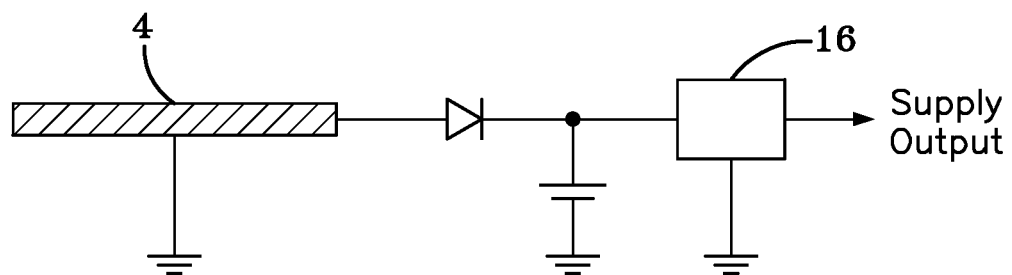
FIG. 6 depicts an electrical energy storage device, such as a capacitor, with an electrical voltage converter which compensates for the energy transfer fluctuations as an air spring changes in height.

FIG. 6 depicts an electrical energy storage device, such as a capacitor, rechargeable battery, or a Goldcap device) with an electrical voltage converter 16 which compensates for the energy transfer fluctuations as the air spring changes in height. Alternatively, the IR energy transfer has to be relative high all the time to ensure that there is always sufficient electric supply available for the height sensor transmitter electronics.

This application claims benefit of European Patent Application Serial No. EP 13163790.2, filed on Apr. 15, 2013. It should be understood that the features described in individual exemplary embodiments may also be combined with each other in order to obtain a more fail safe air spring height sensor or air spring as well as to enable error detection and correction of the measured height signal. While certain representative embodiments and details have been shown for the purpose of illustrating the subject invention, it will be apparent to those skilled in this art that various changes and modifications can be made therein without departing from the scope of the subject invention.

What is claimed is:
1. A distance sensor comprising:
a signal receiving unit,
an electromagnetic wave transmitting unit, and
a magnetic signal transmitting unit;
  wherein the magnetic signal transmitting unit is adapted to transmit to the signal receiving unit a sensed distance between the signal receiving unit and the magnetic signal transmitting unit,
  wherein the magnetic signal transmitting unit further comprises an electromagnetic wave receiving unit and an electromagnetic wave-to-electric power converter,
  wherein the electromagnetic wave receiving unit receives electromagnetic waves transmitted from the electromagnetic wave transmitting unit to operate the magnetic signal transmitting unit,
  wherein the electromagnetic wave transmitting unit is a photon-based energy wave transmitting unit adapted to transmit only a single source of energy to the electromagnetic wave receiving unit; and wherein the electromagnetic wave transmitting unit and the electromagnetic wave receiving unit operate within the wavelength range of about 700 nanometers to 1100 nanometers.

2. The distance sensor according to claim 1, wherein the signal receiving unit includes the electromagnetic wave transmitting unit.

3. The distance sensor according to claim 1 wherein the electromagnetic wave transmitting unit and the electromagnetic wave receiving unit operate within the wavelength range of about 850 nanometers to 950 nanometers.

4. The distance sensor according to claim 1 wherein the magnetic signal transmitting unit comprises an energy storing element fed by the electromagnetic wave-to-electric power converter to store energy for operating the magnetic signal transmitting unit.

5. The distance sensor according to claim 1 wherein the distance sensor further comprises a lens which is adapted for focusing electromagnetic waves from the electromagnetic wave transmitting unit onto the electromagnetic wave receiving unit.

6. The distance sensor according to claim 1 wherein the distance sensor further comprises at least one mirror which is adapted for focusing electromagnetic waves from the electromagnetic wave transmitting unit onto the electromagnetic wave receiving unit.

7. The distance sensor according to claim 1 wherein the distance sensor further comprises a reflector which is adapted for reflecting electromagnetic waves from the electromagnetic wave transmitting unit onto the electromagnetic wave receiving unit.

8. The distance sensor according to claim 7 wherein the reflector is a rubber surface which is coated with a reflective material.

9. An air spring comprising:
a top plate,
a bottom plate,
a flexible member, and
a distance sensor comprising:
    a magnetic signal receiving unit,
    an electromagnetic wave transmitting unit, and
    a magnetic signal transmitting unit;
    wherein the magnetic signal transmitting unit is adapted to transmit to the magnetic signal receiving unit a sensed distance between the magnetic signal receiving unit and the magnetic signal transmitting unit,
    wherein the magnetic signal transmitting unit further comprises an electromagnetic wave receiving unit and an electromagnetic wave-to-electric power converter,
    wherein the electromagnetic wave receiving unit receives electromagnetic waves transmitted from the electromagnetic wave transmitting unit to operate the magnetic signal transmitting unit,
    wherein the electromagnetic wave transmitting unit is a photon-based energy wave transmitting unit adapted to transmit only a single source of energy to the electromagnetic wave receiving unit, and
    wherein the electromagnetic wave transmitting unit and the electromagnetic wave receiving unit operate within the wavelength range of about 700 nanometers to 1100 nanometers.

10. The air spring according to claim 9, wherein the magnetic signal receiving unit includes the electromagnetic wave transmitting unit.

11. The air spring according to claim 9 wherein the magnetic signal transmitting unit comprises an energy storing element fed by the electromagnetic wave-to-electric power converter to store energy for operating the magnetic signal transmitting unit.

12. The air spring according to claim 9 wherein the distance sensor further comprises a lens which is adapted for focusing electromagnetic waves from the electromagnetic wave transmitting unit onto the electromagnetic wave receiving unit.

13. The air spring according to claim 9 wherein the distance sensor further comprises at least one mirror which is adapted for focusing electromagnetic waves from the electromagnetic wave transmitting unit onto the electromagnetic wave receiving unit.

14. The air spring according to claim 9 wherein the distance sensor further comprises a reflector which is adapted for reflecting electromagnetic waves from the electromagnetic wave transmitting unit onto the electromagnetic wave receiving unit.

15. The air spring according to claim 14 wherein the flexible member has an inside surface which is coated with a material which reflects the electromagnetic waves.

16. An air spring comprising
a piston,
a top plate,
a flexible member, and
a distance sensor, wherein the flexible member is affixed to the piston and the top plate,
    wherein the piston, the top plate and the flexible member define a pressurizable chamber,
    wherein the distance sensor comprises a signal receiving unit, an electromagnetic wave transmitting unit, and
    a magnetic signal transmitting unit;
    wherein the magnetic signal transmitting unit is adapted to transmit to the signal receiving unit a sensed distance between the signal receiving unit and the magnetic signal transmitting unit,
    wherein the magnetic signal transmitting unit comprises an electromagnetic wave receiving unit and an electromagnetic wave-to-electric power converter,
    wherein the electromagnetic wave receiving unit receives electromagnetic waves transmitted from the electromagnetic wave transmitting unit to operate the magnetic signal transmitting unit,
    wherein the electromagnetic wave transmitting unit is a photon-based energy wave transmitting unit adapted to transmit only a single source of energy to the electromagnetic wave receiving unit,
    wherein the signal receiving unit, the electromagnetic wave transmitting unit, and the magnetic signal transmitting unit are situated within the pressurizable chamber, and
    wherein the electromagnetic wave transmitting unit and the electromagnetic wave receiving unit operate within the wavelength range of about 700 nanometers to 1100 nanometers.

* * * * *